(12) United States Patent
Bublitz et al.

(10) Patent No.: US 6,279,047 B1
(45) Date of Patent: *Aug. 21, 2001

(54) METHOD FOR SIMPLIFYING COMMUNICATION WITH CHIP CARDS

(75) Inventors: Hermann Bublitz, Böblingen; Klaus Rindtorff, Weil i. Schönbuch, both of (DE)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/793,911
(22) PCT Filed: Jun. 7, 1996
(86) PCT No.: PCT/EP96/02483
§ 371 Date: Jun. 13, 1997
§ 102(e) Date: Jun. 13, 1997
(87) PCT Pub. No.: WO97/01147
PCT Pub. Date: Jan. 9, 1997

(30) Foreign Application Priority Data

Jun. 23, 1995 (DE) .............................. 195 22 527

(51) Int. Cl.[7] ..................................... G06F 13/10
(52) U.S. Cl. .................. 710/11; 710/8; 710/10; 710/36; 710/102; 710/104; 710/105
(58) Field of Search ........................ 463/45; 340/825.3; 327/415; 235/492; 711/1, 2, 5, 115, 170, 171, 172, 173, 201; 710/8, 10, 11, 13, 17, 101, 102, 103, 104, 105; 709/328, 329

(56) References Cited

U.S. PATENT DOCUMENTS

| | | | |
|---|---|---|---|
| 4,870,704 | * | 9/1989 | Matelan et al. ................ 710/120 |
| 4,874,935 | * | 10/1989 | Younger ............................. 235/492 |
| 5,327,018 | * | 7/1994 | Karlish et al. ..................... 327/415 |
| 5,517,646 | * | 5/1996 | Piccirillo et al. ..................... 713/1 |
| 5,534,855 | * | 7/1996 | Shockley et al. ................ 340/825.3 |
| 5,590,193 | * | 12/1996 | Le Roux .................................. 380/4 |
| 5,624,316 | * | 4/1997 | Roskowski et al. ................ 463/45 |
| 5,983,288 | * | 11/1999 | Visee .................................... 710/16 |

* cited by examiner

Primary Examiner—B. James Peikari
(74) Attorney, Agent, or Firm—Karl O. Hesse

(57) ABSTRACT

An apparatus according to the invention for communication of an application (10) with a chip card (20) in which there is at least one application data storing means (30), also known as the dictionary, for recording of information concerning application specific data of the application (10), and at least one chip card dialog module (40), also known as the agent, for the generation of commands using the application data storing means (30) for an interface to the chip card (20), whereby the chip card dialog module (40) contains card specific data concerning the chip card (20). A request (100) for communication to the chip card (20) is made by the application (10) to the chip card dialog module (40) which is specified for the chip card (20). Upon the request (100), the chip card dialog module (40) generates at least one command (110), which is required for communication with the chip card (20). To achieve this, the chip card dialog module (40) accesses application specific information for itself which is stored in the application data storing means (30).

26 Claims, 2 Drawing Sheets

METHOD FOR SIMPLIFYING COMMUNICATION WITH CHIP CARDS

TECHNICAL FIELD

The invention relates to an apparatus and a method for the communication of an application with a chip card, as well as a use in reading/writing devices for chip cards.

DESCRIPTION OF RELATED ART

Cards with an integrated electronic chip which are efficient, generally small, roughly in the size and shape of a credit card, and made preferably of plastic or metal, are known today as data carrier cards or chip cards. In contrast to simple storage cards (which are known as memory chip cards or memory cards), intelligent data carrier cards (also known as multifunctional chip cards or smart cards) possess, in addition to their memory function, their own processor for control of the data stored on the chip of the data carrier card. This makes better protection of the data possible, and results in improved functioning of the chip cards. In general, simple memory cards allow only writing and reading of data. Smart cards, in addition to these functions, also possess functions for structuring of the data, for isolating the data, for administration of the data and for protection of the data. The interface of a smart card, and thus the programming required in order to read data from the chip card (of command sequences, for example), is therefore significantly more complex than that of memory cards.

The installation of chip cards, which is growing primarily due to their enhanced security against tampering, extends to a wide range of application areas. Applications with chip cards, that is, applications in which the communication of any random device with a chip card is required, may be for making payments without cash, identification of the chip card holder, the storage of data, or other similar uses. An application of this type consists of internal application segments on the chip card and external application segments in corresponding devices such as automatic cash machines, PC's or special terminals. In general, internal application segments represent all of the data and programs which are in memory on the chip card itself, while the external application segments represent all of the data and programs outside of the chip card. Programming of these external application segments is typically the responsibility of those who program the devices with which a chip card is to be installed. Frequently, these devices have a complex software platform of their own. In order to integrate applications with chip cards in these instances, extensive knowledge of the structure of the stored data and the interface of the chip card is required.

Most of the chip cards used differ widely among themselves from manufacturer to manufacturer. Many of the chip cards implement a partial set of ISO Standard 7816, and also make use of several special functions. In addition, there is in actual practice the required knowledge of the details of the internal and external application segments to be implemented.

In order to enable access to the data stored on chip cards, a fixed programming (coding) of commands is usually executed. This means, however, increased rigidity of the application and poor maintainability.

When the chip cards are installed, an encryption of the data or the commands for authentication of the chip card or of the world external to the chip card is generally used. To do this, a symmetrical encryption algorithm such as DES (digital encryption standard) or an asymmetrical encryption algorithm such as the public key algorithm is generally used. A Personal Identification Number (PIN) is used almost exclusively for authentication of a chip card holder at this time. In addition to devices such as read/write devices for chip cards, there are also especially further elements, such as authentication elements for encryption and for input of the PINs, which must be taken into consideration for an application with chip cards and which may be involved in such an application.

Communication of the elements and devices, which is realized by hardware or software with the external application segments, is performed through the use of programming interfaces. For a chip card, however, a simple interface is not satisfactory. Due to the complexity of the data structures and also of the required commands, it is not enough to use the imbedding of the commands in another protocol or the use of a higher programming language. For application specific data, this also presumes knowledge of the internal structures of the chip card and hence of their accessibility and their method of access through the application via the interface to the chip card.

SUMMARY OF THE INVENTION

The object of the invention is to create a simplification of the interface for communication with a chip card. This object is achieved in accordance with the independent claims.

An apparatus according to the invention for communication of an interface with a chip card usually has at least one application data storing means (also known as the dictionary) for recording of information concerning application specific data of the application, and at least one chip card dialog module (also known as the agent) for the generation of commands using the application data storing means for an interface to the chip card, whereby the chip card dialog module contains card specific data concerning the chip card.

A request for communication with the chip card is made by the application to the chip card dialog module specified for the chip card. In response to the request, the chip card dialog module generates at least one command which is required for communication with the chip card. To achieve this, the chip card dialog module employs application specific information which is stored in the application data storing means.

In order to facilitate the implementation of different types of chip cards, it is necessary to obtain an interface of the application to the chip card which is as uniform as possible. In accordance with the invention, there is a separation between application specific data and card specific data. Application specific data are those data which contain information concerning the type, location, size and access methods for the data stored on a chip card, as well as the actual data stored on the chip card. On the other hand, card specific data represent those data which provide information concerning the commands and the protocol of a chip card which are required for access to the data stored there.

The separation between application specific data and card specific data makes it possible that one and the same application may be implemented with different types of chip cards. This leads to a significant simplification of the interface to the chip cards, and also improves the separation between internal application segments on the chip card and application segments which are external and separated from the chip card. In this manner, a flexible adaptation to new applications and chip card types is supported.

The solution described here facilitates the integration of chip cards in existing applications and also the implementation of new applications. By the separation of application specific and card specific data, the knowledge required for applications is minimized, and their use is simplified. The maintainability of the internal as well as external application segments is significantly improved. The application of the chip card is relieved of card specific aspects such as commands, protocols and data structures. At the same time, an asynchronous operational mode is made possible, in addition to the synchronous mode.

The invention has preferential applications in read/write devices for chip cards in the broadest sense, that is, in PC·s or other devices which coordinate, control and either directly or indirectly perform communication with chip cards.

DESCRIPTION OF THE PREFERRED EMBODIMENT

Figure 1:
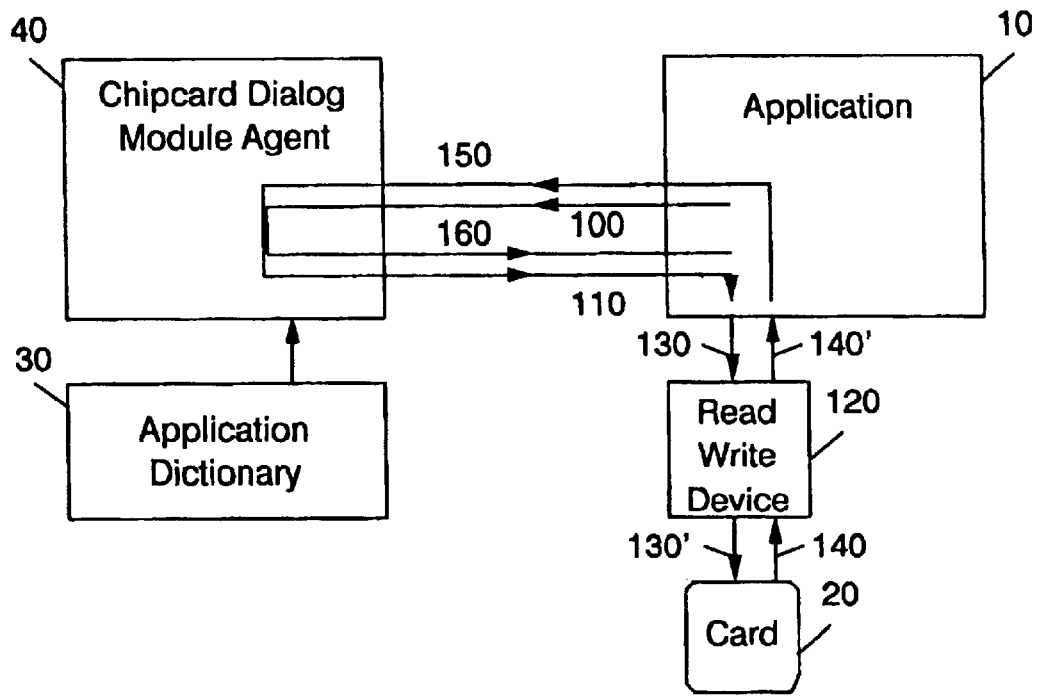
FIG. 1 a schematic representation of the communication of an application with a chip card in accordance with the invention, FIG. 2 the use of several dictionaries and/or several agents for a number of different applications and types of chip cards, FIG. 3 a further embodiment which makes possible a reduction of overhead in the communication with the chip card.

FIG. 1 depicts a schematic representation of the communication of an application 10 with a chip card 20 in accordance with the invention. The application 10 is separated from chip card 20 and may be located, as an example, in a read/write device, a computer, or any other environment which is capable of communication with a chip card 20. An application data storing means, the so called application dictionary 30, serves for the recording of application specific data. A chip card dialog module, the so called agent 40 (smart card agent or smart card interpreter), generates the commands required for the interface of the chip card 20.

The dictionary 30 contains information concerning the type, location, size and access methods of the data stored on the chip card, as well as information for the processing of these data which may be necessary based on security options of the application 10. For simple identification of the data concerned for access through an application 10, the data are assigned one or more alias names. This information is filed in the dictionary 30 in an appropriate form, such as in a table or hierarchy, and contain all of the necessary information for the application 10, or for a number of additional applications (for further details regarding this, refer to FIG. 2). Access to the dictionary 30 takes place through the agent 40. The assignment of a dictionary 30 to an agent 40 is effected through the external application segment or a special extension of the agent 40.

The generation of the dictionary 30 is preferably brought about by the manual creation of the required data. To achieve this, all of the information for all of the data on the chip card 20, including their characteristics, are necessary. The data on the chip card 20 which are accessible from the application 10 are provided with alias names which are intended for the dictionary 30.

If the data of the chip card 20 are to be processed, the application 10 submits a request 100 to the agent 40. A request 100 of this type contains information concerning the desired access method, as well as the alias names of the desired data. In response to this request 100, the agent 40 generates the command sequence required in order to access the data on the chip card 20. To achieve this, it makes use of the information which is stored in an entry for each alias name concerned in the dictionary 30. The necessary parameters of the access method are given to the agent 40 with the request 100. The alias name of the data, the read method to be employed, and data concerning the filing location of the answer to the request 100, for example, belong to a request 100, which is to perform a reading of a date on a chip card. This type of request may also consist of the access mode READ for data with the alias name ACCOUNT NUMBER, and a memory address for the filed data. In addition to the read and write methods, authentication, generation or deletion of structures, as well as the application specific commands which may be implemented with chip cards may also occur here. In these instances there are methods stored on the chip card 20 which are initiated by special commands. For example, this may be the modification of an amount in a cash account stored on the chip card 20.

In order to make simple imbedding into existing systems possible, it is frequently required that an asynchronous functional mode of the agent 40 be ensured. Many of the software platforms in use require event controlled programming. A synchronously functioning module could possibly lead to a temporary blockage of the entire system. However, the duration of this blockage is frequently not supportable for these chip card applications, since this includes a data transfer to a relatively slow medium as well as the processing of commands of a relatively slow working processor.

The agent 40 is preferably implemented as an asynchronous module, but may also be operated synchronously. Upon the request 100 of the application 10, the agent 40 generates a sequence of commands for the chip card. Each command 110 of the sequence is given back to the application individually. The application transfers the respective command 110 of the agent 40 as an application command 130 to a corresponding read/write device 120 for direct reading and writing of data on the chip card 20. At this point it should be mentioned that the application 10, as has been described above, may also be situated directly in a read/write device 120. For certain applications, a single command 110 may be adequate instead of a series of commands.

The read/write device 120 transfers the application command 130, or an application command 130' derived from it, to the chip card 20 and receives from it the response 140. The data of the response 140, or those of a response 140' similarly derived from it, are accepted by the application 10 and in turn fed to the agent 40 as response data 150. The agent interprets the response data 150 and generates thereupon the next command if necessary. The process is repeated until the desired data have been processed. At the end of the process, or also continuously through the command sequence, the agent 40 transfers a data record 160 as a reaction to the request 100, and the data returned from the chip card 20 to the application 10. This data record represents the response of the chip card 20, which is intelligible for the application 10, to the request 100 of the application 10 which was not intelligible to the chip card 20.

The implementation of the agent 40 is performed preferably through the use of the concept of the finite automatic machine. This type of automatic machine is capable of storing its own internal condition and, based on input data and its current condition, to convert to another condition. Programming of this automatic machine is performed through the pre-selection of the desired condition conversions for the specific combinations of momentary condition and input data.

During generation of the commands, there are also instances of the use of data or commands which are protected by codes, with the resulting required encryption/decryption, for example on the chip card 20. For reasons of security, these should generally not be performed by the agent 40 itself. The agent 40 will therefore, through an appropriate request to the application 10, signal this requirement and deliver the required data. The application 10 will in most cases in turn pass this request on to a specialized module for encryption. After the response, the agent 40 will continue the generation of the command sequence.

In addition to requests for encryption, requests may also be made to the read/write device 120, as well as requests to a PIN input device (not shown), among others. These requests are passed on by the application 10 to the appropriate devices for processing.

In order to communicate with the chip card 20, the application 10 will first select the appropriate agent 40 (for example, from a number of possible agents). At the latest point, the desired dictionary 30 is also specified at the time of the generation of a request to an agent 40. Both take place based on special response data of the card, which are received, for example, through an initial query from the chip card 20 and by knowledge of the specific application 10 which is performing the transaction. After the selection of the agent 40 and the dictionary 30, the request 100 may be submitted to the agent 40 by the application 10. At that point, the agent 40 searches the dictionary 30 for the alias names contained in the request 100 and receives then the necessary application specific information concerning them. The first request 100 places the agent 40 into a start mode and, upon this, the first command of the required command sequence is generated. With each response to a command, the agent 40 will alter its internal condition and gather information concerning the progress of the sequence. The generation of commands is concluded as soon as the agent 40 has reached an end condition which is relevant for the request. This is the case if an error should have occurred in communication, or if the data have been successfully processed.

If an alteration of the application 10 through a modification of the data stored on the chip cards should be necessary, then this may be limited to an alteration of the dictionary 30. A new dictionary 30' (not shown) is made available to the application 10, and the application 10 itself does not need to be changed. An alteration of the segments of the application 10 relating to the chip card 20, such as the use of chip card types with a different interface for example, leads to the generation of a new agent 40' (not shown). The information related to the data of the application 10 in the dictionary 30 or 30' do not have to be altered in this instance.

It is to be understood that the command 110 and the response 140 of the agent 40 are preferably not changed either through the application 10 or through the read/write device 120, or any other possible devices located between the agent 40 and the chip card 20. The signals 110, 130 and 130' are in this instance identical, and the chip card 20 receives the command 110 of the agent 40 indirectly and transfers to it in turn (again indirectly) its response 140 to the command 110. Hence, the signals 140, 140' and 150 are also identical. In a similar manner, the direct transfer of the command 110 to the chip card 20, and of the corresponding response 140 back to the agent 40, may be attained in each instance. It is also to be understood that the agent 40 may be operated in an asynchronous as well as a synchronous mode.

In the asynchronous mode, the application 10 does not wait for a reply from the agent 40 to the request 100, and is hence also available between the request 100 and its reply. In the synchronous mode, however, the application 10 waits for a reply from the agent 40 to the request 100, and is hence not available until after the completed reply.

Figure 2:
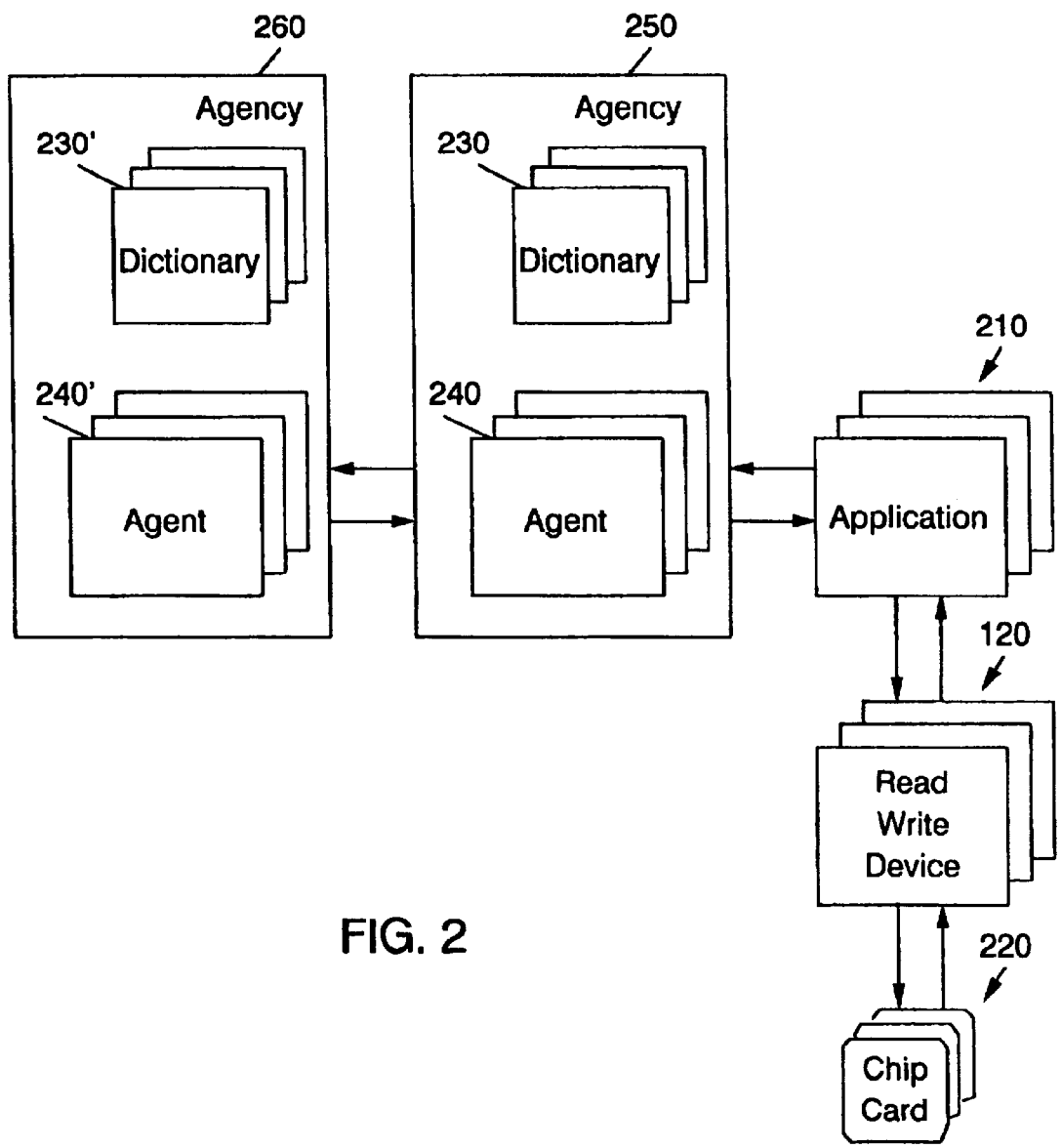

FIG. 2 depicts the use of several dictionaries 230 and/or several agents 240 for a number of differing applications 210 and types of chip cards 220. A so called agency 250 is invoked by the application 10 from the number of applications 210 instead of the agent 40, as in FIG. 1. It is the task of the agency 250 to manage the various dictionaries 230 and agents 240, and to provide for the availability of corresponding versions as required. To achieve this, a list of all local dictionaries 230 and agents 240, with their characteristics and also their criteria, is preferably used when these are to be applied. If there is no appropriate agent and no appropriate dictionary available, the necessary original or a copy thereof may be requested from a different agency 260. This may be performed through a local network as well as over appropriate communication paths between the agencies 250 and 260.

If, in the implementation of an agent 40, an interpreted program language is applied, one and the same implementation may also be applied on devices with differing hardware and operating systems. To achieve this, an appropriate interpreter is implemented for each device, which processes the program of the agent through interpretation.

Figure 3:
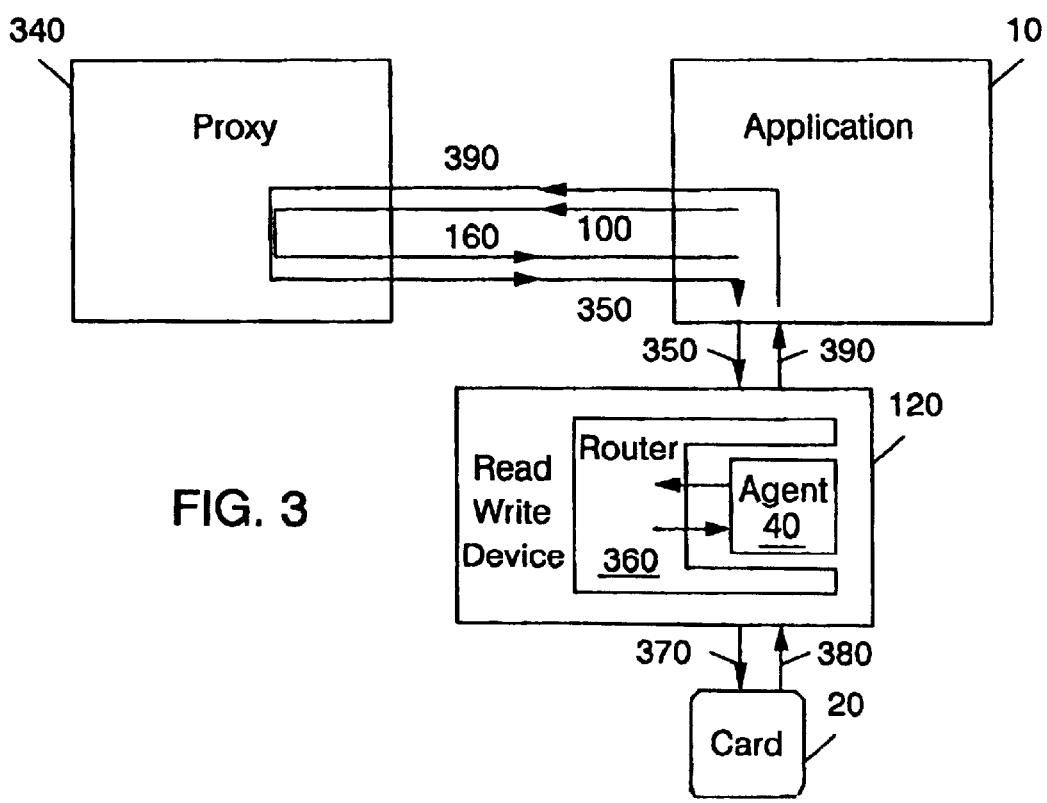

If, during the transport of the commands from the agent 40 to the chip card 20, several program levels are to be traversed, significant overhead may then result in the communication with the chip card 20. This may be reduced if, as is depicted in FIG. 3, the agent 40 is placed closer to the chip card 20. To achieve this, the agent 40 is replaced by a substitute, the so-called proxy 340. The proxy creates a single data record 350 for each request 100 with all of the required information from the dictionary 30 and allows this to be sent to a router 360. The router 360 receives the data record 350 of the proxy 340, and then in turn instructs the agent 40, which has been shifted to this level. All of the commands 370 generated by the agent 40 are now sent to the chip card 20 through the router 360, and every response 380 is sent in return to the agent 40. A result 390 of the request 100 after communication of the agent 40 with the chip card 20 is finally given back to the proxy 340 by the router 360, and then passed on by the router as the response 160 to the application 10. The proxy 340 ensures a uniform interface for the application 10, so that it does not have to be modified in its use. The application 10 remains independent of whether it communicates with the agent 40 or its proxy 340. The router 360 is preferably placed on the same level as the agent 40, while the dictionary 30 remains on the level of the application 10 or of the agency 230.

It should be noted that the read/write device 120 exemplifies an abstract representation of a device with a direct access to the chip card 20. The read/write device 120 may nevertheless consist of a number of individual devices and layers with individual interfaces among each other.

It is to be understood that the invention relates to simple memory boards as well as smart data carrier cards with their own processor for the control of the data stored on the chip of the data carrier card.

A modification of the dictionary 30 may also be effected in accordance with the invention directly through the agent 40 or the agency 250. This is especially an advantage when structures on the chip card 20 are to be created or modified using the agent 40, for example when the agent 40 is to store or restructure a new file on the chip card 20.

In one embodiment of the invention, the dictionary 30 is located directly on the chip card 20. Through this, it is possible that the necessary dictionary 30 is always directly available to the chip card 20. In a further embodiment, the dictionary 30, which is located directly on the chip card 20, is copied by this chip card 20 and stored (preferably by the agent 40), and is available to the agent 40 or the agency 250 for further chip cards of the same chip card type.

Operation of the Preferred Embodiment

The following example is intended to show the process flow of a command sequence. The application 10 reads an account number from chip card 20. The agent 40 to be used is selected based on the card characteristics of the chip card type of the chip card 20. The application 10 sends the request 100 to the agent 40, to which a specific dictionary 30 has already been assigned by a previous selection, based on the card data of the chip card type of the chip card 20. Table 1 depicts an excerpt from this assigned dictionary 30.

The request 100 contains as parameters the command "READ", the alias name "ACCOUNT NUMBER", and the memory address of a buffer in which the result of the request 100 is to be filed. The agent 40 then searches the dictionary 30 for the alias name "ACCOUNT NUMBER" (refer to Table 1). When found, the entry provides the information as to the directory and the file of the chip card 20 in which this data item is to be found, as well as information regarding the type and size of the data item, and security relevant information. The data on the chip card 20 in this example are arranged in directories such as are typically understood for data systems of computers.

In this example, the path indicator "3F00.A100.4001" is found in Table 1 (marked with an arrow) under the alias name "ACCOUNT NUMBER", and also the information that the type of the file is TRANSPARENT. The data item is located in the file with the offset 4 and a length of 5 bytes. The indication of the code domain CREDIT and the authorization domain AUT_CREDIT serve for translation of the logical code numbers into physical numbers. Upon entry of the passwords (with a PIN) the domain GLOBAL is used for PIN1 and PIN2. A domain for a specific object represents a group of directories and files, which access a common entity of these objects.

The agent 40 initiates the generation of a command sequence for the selection of the required directory on the chip card 20 based on the path indicator "3F00.A100.4001". In this, the current directory selection is taken into consideration. In the event that the directory 3F00 has already been selected, the first command 110 which is generated will be for selection of the subdirectory A100. This first command 110 is passed back to the application 10 with a signal that the command sequence should be continued. The application 10 then forwards the first command 110 as a command 130 to an interface for transmitting to the read/write device being used by the chip card 20. The device then transmits the command 130 to the chip card 20. The chip card 20 sends a response 140 with a confirmation of the selection and, if necessary, other information about the selected directory. The response 140 is returned by the read/write device 120 to the application 10, which immediately passes it on as response data 150 to the agent 40.

The response data 150 are presented in general in a format which is not intelligible for the application 10. In order to be able to understand the response data, extensive knowledge of the agent 40 must be available through the chip card 20. The agent 40 is able to form conclusions from the response data 150 as to the success of the first command 110, and to gather information regarding the progress of the command sequence. As a next step, a second command 110' for the selection of the file 4001 is communicated to the application 10, which is treated as was the first command 110.

Finally, an additional command 110" is generated for reading of the requested data. For this, the information as to the location (Offset=4) and size (length=5) of the account number is used. The command 110" is transmitted as the command 110 previously was, and correspondingly answered by the chip card 20. The response data 150" of the chip card 20 also contain at this point the desired data. These data may be as an example encrypted, which the agent 40 recognized based on previous information during the selection of the file. At this point, a request 160 of the agent 40 will be generated to the application 10 in order to perform the encryption of the data. The application 10 may itself perform the encryption, or it may send it on to an additional specialized module. The result is returned as the response data item 150'" to the agent 40. The agent now copies the data in a format which is intelligible to the application 10 into the buffer memory which was indicated upon the original request 100 and signals the end of the command sequence to the application 10. The application 10 may now access the account number and send the next request to the agent 40.

What is claimed is:

1. Apparatus for responding to an application request by generating a command sequence to access a chip card, comprising:

reading means for reading card type information from the chip card;

an external layer separate from the chip card comprising:

one chip card dialog module selected from a plurality of chip card dialog modules using the card type information, the chip card dialog module containing card specific means responsive to application data information for generating commands in accordance with a protocol of the chip card;

at least one application data storing means separate from the dialog module for storing the application data information pertaining to type, location, size and access methods of data stored on the chip card;

more than one of the plurality of chip card dialog modules using the same application data information for generating commands to interface to respective chip cards;

whereby the application is relieved of commands protocols of a plurality chip cards that may be used with the application.

2. Apparatus of claim 1, further comprising:

an allocation device for allocating an application data storing means to a chip card dialog module.

3. Apparatus of claim 1, wherein the information for one or more applications is contained in the application data storing means.

4. Apparatus of claim 1, wherein the chip card dialog module is implemented as a finite automatic machine.

5. Apparatus of claim 1, further comprising:

at least one agency which is responsible for administration of each type of chip card dialog module and application data storing means, and which is used by the application to determine the appropriate combination of chip card dialog module and application data storing means for each type of chip card.

6. Apparatus of claim 5, wherein at least one agency is linked with another agency through a communication path.

7. Apparatus of claim 1, further comprising:
a proxy which is placed substantially at the programming level of the application and which replaces the chip card dialog module in its communication with the application, the proxy providing a means for the creation of a data record, wherein the data record contains information from the application data storing means in response to a request of the application;
a router having a means for receiving the data record and a copy of the chip card dialog module;
wherein the router sends a command generated by the copy of chip card dialog module to the chip card, and the copy of the chip card dialog module returns a response from the chip card to the proxy and the proxy passes the response to the application.

8. A method for responding to an application request by generating a command sequence to access a chip card, comprising the steps:
receiving identification of a chip card:
applying to a chip card dialog module which is specified for the chip card from a plurality of chip card dialog modules, for card specific command generating steps in accordance with a protocol of the chip card, and
generating at the chip card dialog module, at least one command which is required for communication with the chip card, in accordance with the protocol of the chip card by accessing application specific information which is stored in memory in an application data storing means and wherein others of the plurality of chin card dialog modules may also access the same application specific information allowing the application to be relieved of the commands and protocols of a plurality of chip cards that may be used with the application.

9. A method of claim 8, further comprising the step of receiving the special response data from the chip card in response to an initial query to the chip card.

10. A method of claim 8, wherein;
the chip card dialog module of the requesting step is selected by the application from a number of chip card dialog modules; and
the application data storing means of the generating step is specified as part of the request to the chip card dialog module;
whereby both steps are based upon the special response data from the chip card and information concerning the specific application being performed.

11. A method of claim 8, wherein a first request places the chip card dialog module into a start mode, for generating a first command of a command sequence, in which the chip card dialog module alters its internal condition with each response to a command and gathers information concerning the progress of the sequence, and aborts the generation of commands as soon as the chip card dialog module has reached a relevant end condition for the request.

12. A method of claim 11, wherein the end condition is reached when an error occurs during the communication, and when data has been successfully processed.

13. A method of claim 8, further comprising the step of:
altering a specific application data storing means to create a new application data storing means for modifying the data stored on the chip card, without altering the application program itself.

14. A method of claim 8, further comprising the steps of:
placing a proxy substantially at the level of the application to replace the chip card dialog module in its communication with the application, and which, upon the request of the application, creates a data record which contains information from the application data storing means;
receiving at a router, a copy of the chip card dialog module and the data record;
sending a command from the router which was generated by the copy of the chip card dialog module to the chip card; and
receiving a response from the chip card at the copy of the chip card dialog module;
the router returning the response from the chip card to the proxy and the proxy passing the response to the application.

15. A method of claim 8, wherein an application data storing means which is located on the chip card is copied from the chip card and stored in external apparatus, making it available to the chip card dialog module.

16. Apparatus for responding to an application request by generating a command sequence to access a smart card, comprising:
reading means for reading card type information from the smart card; and
an external layer separate from the smart card comprising:
one smart card dialog module selected from a plurality of smart card dialog modules using the card type information, the smart card dialog module containing card specific means responsive to application data information for generating commands in accordance with a protocol of the smart card;
at least one application data storing means separate from the dialog module for storing the application data information pertaining to type, location, size and access methods of data stored on the smart card;
more than one of the plurality of smart card dialog modules using the same application data information for generating commands to interface to respective smart cards;
whereby the application is relieved of commands and protocols of a plurality smart cards that may be used with the application.

17. Apparatus of claim 16, comprising:
at least one agency which is responsible for administration of each type of smart card dialog module and application data storing means, and which is used by the application to determine an appropriate combination of smart card dialog module and application data storing means for each type of smart card.

18. Apparatus of claim 16, further comprising:
a proxy which is placed substantially at a programming level of the application and which replaces the smart card dialog module in its communication with the application, the proxy providing a means for the creation of a data record, wherein the data record contains information from the application data storing means in response to a request of the application;
a router having a means for receiving the data record and a copy of the smart card dialog module;
wherein the router sends a command generated by the copy of smart card dialog module to the smart card, and the copy of the smart card dialog module returns a response from the smart card to the proxy and the proxy passes the response to the application.

19. A method for responding to an application request by generating a command sequence to access a smart card, comprising the steps:

receiving identification of a smart card:

applying to a smart card dialog module which is specified for the smart card from a plurality of smart card dialog modules, for card specific command generating steps in accordance with a protocol of the smart card, and generating at the smart card dialog module, at least one command which is required for communication with the smart card, in accordance with the Protocol of the smart card by accessing application specific information which is stored in memory in an application data storing means and wherein others of the plurality of chin card dialog modules may also access the same application specific information allowing the application to be relieved of the commands and protocols of a plurality of smart cards that may be used with the application.

20. A method of claim 19, further comprising the step of receiving the special response data from the smart card in response to an initial query to the smart card.

21. A method of claim 19, wherein;

the smart card dialog module of the requesting step is selected by the application from a number of smart card dialog modules; and the application data storing means of the generating step is specified as part of the request to the smart card dialog module;

whereby both steps are based upon the special response data from the smart card and information concerning the specific application being performed.

22. A method of claim 19, wherein a first request places the smart card dialog module into a start mode, for generating a first command of a command sequence, in which the smart card dialog module alters its internal condition with each response to a command and gathers information concerning the progress of the sequence, and aborts the generation of commands as soon as the smart card dialog module has reached a relevant end condition for the request.

23. A method of claim 22 wherein the end condition is reached when an error occurs during the communication, and when data has been successfully processed.

24. A method of claim 19, further comprising the step of:

altering a specific application data storing means to create a new application data storing means for modifying the data stored on the smart card, without altering the application program itself.

25. A method of claim 19, further comprising the steps of:

placing a proxy substantially at the level of the application to replace the smart card dialog module in its communication with the application, and which, upon the request of the application, creates a data record which contains information from the application data storing means;

receiving at a router, a copy of the smart card dialog module and the data record;

sending a command from the router which was generated by the copy of the smart card dialog module to the smart card; and receiving a response from the smart card at the copy of the smart card dialog module;

the router returning the response from the smart card to the proxy and the proxy passing the response to the application.

26. A method of claim 19, wherein an application data storing means which is located on the smart card is copied from the smart card and stored in external apparatus, making it available to the smart card dialog module.

\* \* \* \* \*